United States Patent
Ebersole

(10) Patent No.: US 6,367,744 B1
(45) Date of Patent: Apr. 9, 2002

(54) PIPE SUPPORTING APPARATUS

(76) Inventor: Richard A. Ebersole, 13039 Spickler Rd., Clear Spring, MD (US) 21722

( * ) Notice: Subject to any disclaimer, the term of this patent is extended or adjusted under 35 U.S.C. 154(b) by 0 days.

(21) Appl. No.: 09/544,439

(22) Filed: Apr. 7, 2000

(51) Int. Cl.$^7$ .................................................. F16L 3/00
(52) U.S. Cl. ........................... 248/58; 248/62; 248/72; 248/74.2; 248/74.1; 248/316.7; 248/231.81; 24/458
(58) Field of Search .......................... 248/58, 74.2, 72, 248/62, 74.1, 316.7, 231.81, 228.7; 403/329; 24/458, 545, 563

(56) References Cited

U.S. PATENT DOCUMENTS

| | | | |
|---|---|---|---|
| 2,670,919 A | | 3/1954 | Esoldi |
| 3,021,103 A | * | 2/1962 | Beyerle ........................ 248/57 |
| 3,162,413 A | | 12/1964 | Hexdall |
| 4,119,285 A | * | 10/1978 | Bisping et al. ................ 248/72 |
| D293,203 S | | 12/1987 | Hertensteiner |
| 5,024,405 A | * | 6/1991 | McGuire ...................... 248/73 |
| 5,050,824 A | * | 9/1991 | Hubbard ...................... 248/57 |
| 5,060,892 A | | 10/1991 | Dougherty |
| 5,230,488 A | * | 7/1993 | Condon ........................ 248/73 |
| 5,593,115 A | | 1/1997 | Lewis |
| D395,816 S | | 7/1998 | Colodny |
| 5,938,157 A | * | 8/1999 | Reiker ....................... 248/200.1 |
| 6,033,098 A | * | 3/2000 | Hentz et al. ................. 362/430 |
| 6,216,987 B1 | * | 4/2001 | Fukuo ........................ 248/74.2 |

* cited by examiner

*Primary Examiner*—Anita King
*Assistant Examiner*—Steven Marsh

(57) ABSTRACT

A pipe supporting apparatus for supporting pipes extending between support members of a structure. The pipe supporting apparatus includes a rod. The rod is elongate and has a first end and a second end. A pair of mounting means removably mounts the rod to support members. Each of the mounting means is integrally coupled to an end of the rod. A plurality of coupling members couple the pipes to the rod. Each of the coupling members includes a first and second bracket. The first bracket is adapted for removably coupling to the rod. The second bracket is adapted for removably coupling the pipe to the first bracket. The second bracket is coupled to the first bracket.

6 Claims, 2 Drawing Sheets

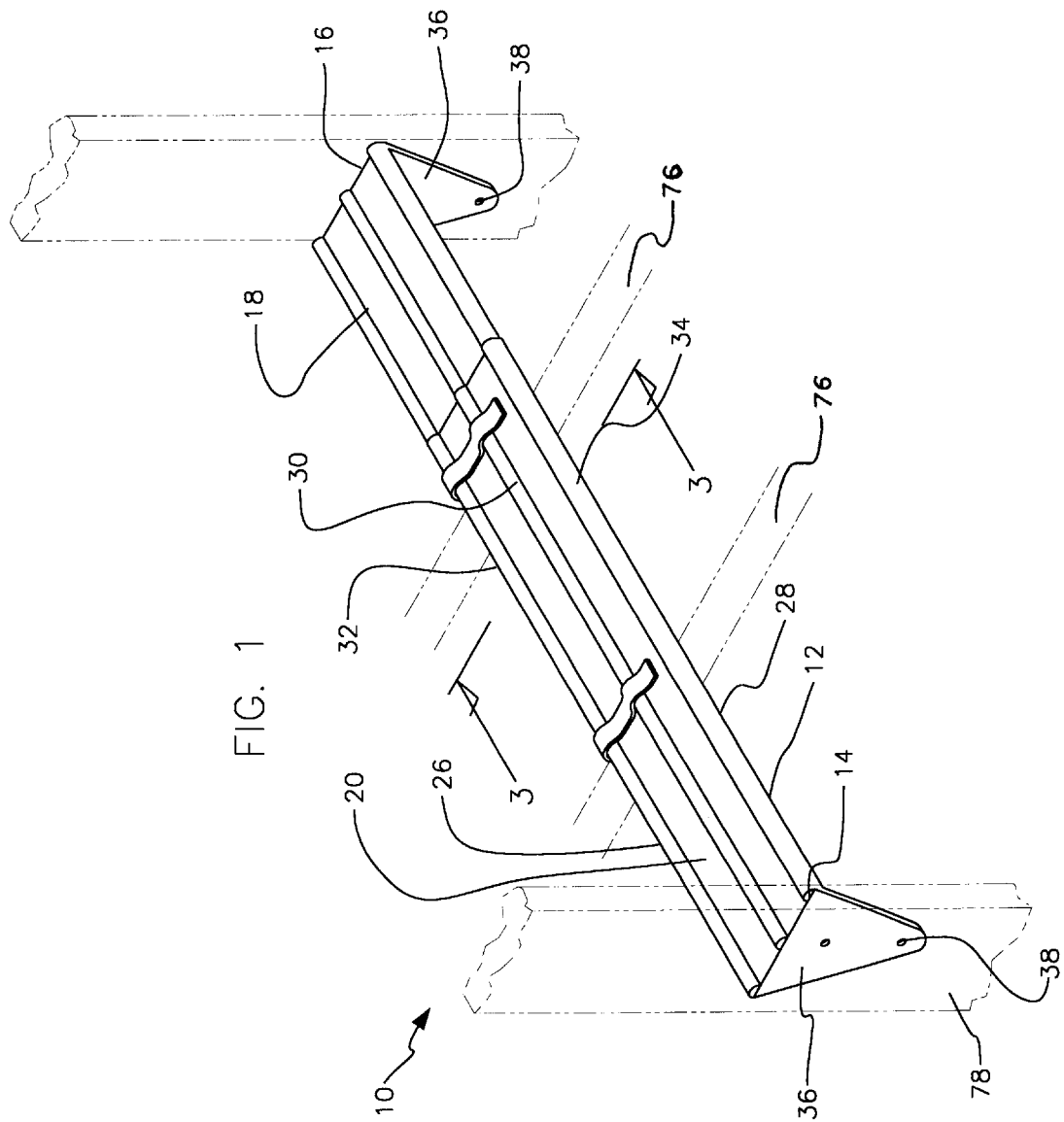

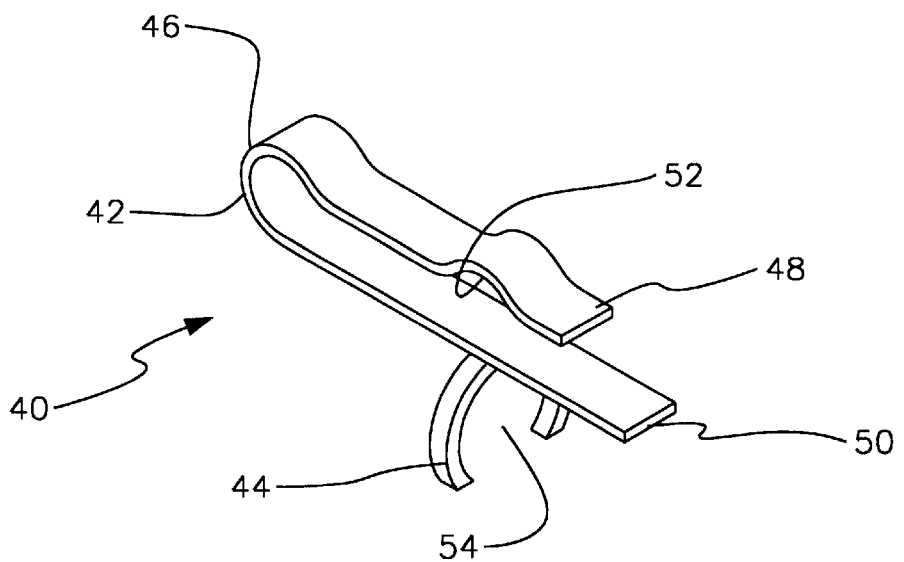
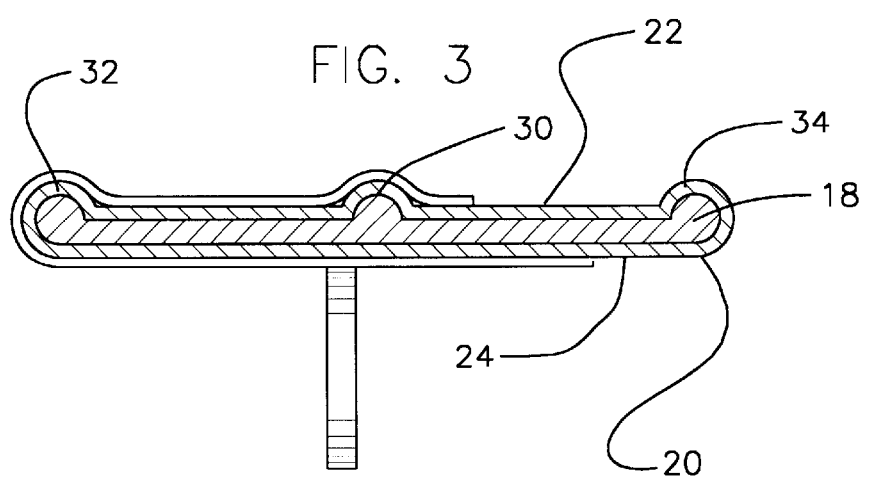

PIPE SUPPORTING APPARATUS

BACKGROUND OF THE INVENTION

1. Field of the Invention

The present invention relates to pipe supporting devices and more particularly pertains to a new pipe supporting apparatus for supporting pipes extending between support members of a structure.

2. Description of the Prior Art

The use of pipe supporting devices is known in the prior art. More specifically, pipe supporting devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,593,115; U.S. Pat. No. 5,060,892; U.S. Pat. No. 2,670,919; U.S. Pat. No. 3,162,413; U.S. Des. Pat. No. 293,203; and U.S. Des. Pat. No. 395,816.

While these devices fulfill their respective, particular objectives and requirements, the aforementioned patents do not disclose a new pipe supporting apparatus. The inventive device includes a rod. The rod is elongate and has a first end and a second end. A pair of mounting means removably mounts the rod to support members. Each of the mounting means is integrally coupled to an end of the rod. A plurality of coupling members couple the pipes to the rod. Each of the coupling members includes a first and second bracket. The first bracket is adapted for removably coupling to the rod. The second bracket is adapted for removably coupling the pipe to the first bracket. The second bracket is coupled to the first bracket.

In these respects, the pipe supporting apparatus according to the present invention substantially departs from the conventional concepts and designs of the prior art, and in so doing provides an apparatus primarily developed for the purpose of supporting pipes extending between support members of a structure.

SUMMARY OF THE INVENTION

In view of the foregoing disadvantages inherent in the known types of pipe supporting devices now present in the prior art, the present invention provides a new pipe supporting apparatus construction wherein the same can be utilized for supporting pipes extending between support members of a structure.

The general purpose of the present invention, which will be described subsequently in greater detail, is to provide a new pipe supporting apparatus apparatus and method which has many of the advantages of the pipe supporting devices mentioned heretofore and many novel features that result in a new pipe supporting apparatus which is not anticipated, rendered obvious, suggested, or even implied by any of the prior art pipe supporting devices, either alone or in any combination thereof.

To attain this, the present invention generally comprises a rod. The rod is elongate and has a first end and a second end. A pair of mounting means removably mounts the rod to support members. Each of the mounting means is integrally coupled to an end of the rod. A plurality of coupling members couple the pipes to the rod. Each of the coupling members includes a first and second bracket. The first bracket is adapted for removably coupling to the rod. The second bracket is adapted for removably coupling the pipe to the first bracket. The second bracket is coupled to the first bracket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence If of the technical disclosure of the application. The abstract is neither intended to define the invention of the application, which is measured by the claims, nor is it intended to be limiting as to the scope of the invention in any way.

It is therefore an object of the present invention to provide a new pipe supporting apparatus apparatus and method which has many of the advantages of the pipe supporting devices mentioned heretofore and many novel features that result in a new pipe supporting apparatus which is not anticipated, rendered obvious, suggested, or even implied by any of the prior art pipe supporting devices, either alone or in any combination thereof.

It is another object of the present invention to provide a new pipe supporting apparatus which may be easily and efficiently manufactured and marketed.

It is a further object of the present invention to provide a new pipe supporting apparatus which is of a durable and reliable construction.

An even further object of the present invention is to provide a new pipe supporting apparatus which is susceptible of a low cost of manufacture with regard to both materials and labor, and which accordingly is then susceptible of low prices of sale to the consuming public, thereby making such pipe supporting apparatus economically available to the buying public.

Still yet another object of the present invention is to provide a new pipe supporting apparatus which provides in the apparatuses and methods of the prior art some of the advantages thereof, while simultaneously overcoming some of the disadvantages normally associated therewith.

Still another object of the present invention is to provide a new pipe supporting apparatus for supporting pipes extending between support members of a structure.

Yet another object of the present invention is to provide a new pipe supporting apparatus which includes a rod. The rod is elongate and has a first end and a second end. A pair of mounting means removably mounts the rod to support members. Each of the mounting means is integrally coupled to an end of the rod. A plurality of coupling members couple the pipes to the rod. Each of the coupling members includes a first and second bracket. The first bracket is adapted for removably coupling to the rod. The second bracket is adapted for removably coupling the pipe to the first bracket. The second bracket is coupled to the first bracket.

Still yet another object of the present invention is to provide a new pipe supporting apparatus that has coupling members, which are slidably coupled to the rod such that the coupling members may be moved such that they may be coupled to the pipe.

Even still another object of the present invention is to provide a new pipe supporting apparatus that has a telescoping rod such that the rod may be extended between a variety of lengths.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 a schematic perspective view of a new pipe supporting apparatus according to the present invention.

FIG. 2 is a schematic perspective view of the coupling members of the present invention.

FIG. 3 is a schematic cross-sectional side view taken along line 3—3 of the present invention.

DESCRIPTION OF THE PREFERRED EMBODIMENT

With reference now to the drawings, and in particular to FIGS. 1 through 3 thereof, a new pipe supporting apparatus embodying the principles and concepts of the present invention and generally designated by the reference numeral 10 will be described.

As best illustrated in FIGS. 1 through 3, the pipe supporting apparatus 10 generally comprises a rod 12. The rod 12 is elongate and has a first end 14 and a second end 16. The rod 12 comprises a first portion 18 and a second portion 20. The first portion 18 is slidably insertable in the second portion 20 such that the rod 12 comprises a telescoping rod. Additional portions may be added so that the rod can be extended additional lengths. The rod 12 is generally planar and has substantially flat top 22 and bottom 24 surfaces. The rod 12 has a first side edge 26 and a second side edge 28. The rod 12 preferably has a length which is extendable generally between 9 and 17 inches which is a standard distance between conventional support members 78 such as joists or studs.

A plurality of ridges reinforce the rigidity of the rod. Each of the ridges is elongate. The ridges are integrally coupled to the top surface 22 of the rod 12. Each of the ridges extends between the first 14 and second 16 ends of the rod. A first 30 of the ridges is positioned generally between the first 26 and second 28 side edges. A second ridge 32 is generally adjacent to the first side edge 26. A third ridge 34 is generally adjacent to the second side edge 28. Each of the ridges has a generally rounded surface.

A pair of mounting means 36 removably mount the rod 12 to the support members 78. Each of the mounting means is integrally coupled to an end of the rod 12. Each of the mounting means 36 comprises a plate extending downwardly away from the top surface 22. The plates are orientated generally perpendicular to the rod 12. Each of the plates has a pair of holes 38 therein for receiving a conventional fastening means, such as a screw or nail, for fastening the plates to the support members. Preferably, each of the plates generally has a triangular shape such that an apex of each plate is directed away from the rod 12.

A plurality of coupling members 40 couple pipes 76 to the rod 12. Each of the coupling members include a first bracket 42 and a second bracket 44.

The first bracket 42 is adapted for removably coupling to the rod 12. The first bracket 42 has a base portion 46. A first leg 48 and a second leg 50 are integrally coupled to and extend away from the base portion 46. The first 48 and second 50 legs are oriented generally parallel to each other. The first leg 48 has an inside surface having a curve 52 therein such that the curve 52 may be abutted against the first ridge 30. The base portion 46 is rounded such that the base portion may be abutted against the second ridge 32. The first bracket 42 is placed over the rod 12 such that the first leg 48 is adjacent to the top surface 22 and the second leg 50 is adjacent to the bottom surface 24.

The second bracket 44 is adapted for removably coupling the pipe to the first bracket. The second bracket 44 is annular member having a break 54 therein. The annular member is coupled to the second leg 50 such that the break 54 is directed away from the first 48 and second 50 legs. The annular member has an axis orientated generally parallel to a longitudinal axis of the second leg 50.

In use, the rod 12 is mounted between a pair of support members 78 in the area where the pipes 76 are to extend through. The first bracket 42 is placed on the rod 12 in a position adjacent to the pipe. The pipe 76 is then snapped into the second bracket 44 by placing the pipe through the break 54 in the annular member.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pipe supporting device for supporting pipes traveling between support members, said device being removably mountable to and extending between a pair of support members, said device comprising:

an elongate rod having a first end and a second end, said rod being generally planar and having substantially planar top and bottom surfaces, said rod having a first side edge and a second side edge;

an elongate ridge being integrally coupled to said top surface of said rod, said ridge generally extending between said first and second end or said rod, said ridge being positioned generally between said first and second side edges;

a pair of mounting means for removably mounting said rod to the support members, each of said mounting means being integrally coupled to an end of said rod;

a plurality of coupling members for coupling the pipes to said rod, each of said coupling members comprising:

a first bracket having a base portion, a first leg and a second leg being integrally coupled to and extending away from said base portion, said first and second legs being oriented generally parallel to each other, said first leg having an inside surface having a curve therein such that said curve may be abutted against said ridge, wherein said first bracket may be placed over said rod such that said first leg is adjacent to said top surface and said second leg is adjacent to said bottom surface; and a second bracket, said second bracket being adapted for removably coupling the pipe to said first bracket, said second bracket being coupled to said first bracket.

2. The pipe supporting device as in claim 1, wherein said second bracket comprises:

said second bracket being an annular member having a break therein, said annular member being coupled to said second leg such that said break is directed away from said second leg, said annular member having an axis orientated generally perpendicular to said rod when said first bracket is mounted to said rod.

3. A pipe supporting device for supporting pipes traveling between support members, said device being removably mountable to and extending between a pair of support members, said device comprising:

a rod, said rod being elongate, said rod having a first end and a second end, said rod comprising a first portion and a second portion, said first portion being slidably insertable in said second portion such that said rod comprises a telescoping rod, said rod being generally planar and having substantially flat top and bottom surfaces, said rod having a first side edge and a second side edge, said rod having an length being extendable generally between 9 and 17 inches;

a plurality of ridges, each of said ridges being elongate, each of said ridges being integrally coupled to said top surface of said rod, each of said ridges extending between said first and second ends of said rod, a first of said ridges being positioned generally between said first and second side edges, a second ridge being generally adjacent to said first side edge, a third ridge being generally adjacent to said second side edge, each of said ridges having a generally rounded surface;

a pair of mounting means for removably mounting said rod to the support members, each of said mounting means being integrally coupled to an end of said rod, each of said mounting means comprising a plate extending downwardly away from said top surface, each of said plates being orientated generally perpendicular to said rod, each of said plates having a pair of holes therein for receiving a fastening means for fastening said plates to the support members, each of said plates generally having a triangular shape such that an apex of each plate is directed away from said rod;

a plurality of coupling members for coupling the pipe to said rod, each of said coupling members comprising:

a first bracket, said first bracket being adapted for removably coupling to said rod, said first bracket having a base portion, a first leg and a second leg being integrally coupled to and extending away from said base portion, said first and second legs being oriented generally parallel to each other, said first leg having an inside surface having a curve therein such that said curve may be abutted against said first ridge, said base portion being rounded such that said base portion may be abutted against said second ridge, wherein said first bracket may be placed over said rod such that said first leg is adjacent to said top surface and said second leg is adjacent to said bottom surface; and a second bracket, said second bracket being adapted for removably coupling the pipe to said first bracket, said second bracket being an annular member having a break therein, said annular member being coupled to said second leg such that said break is directed away from said second leg, said annular member having an axis orientated generally parallel to a longitudinal axis of said second leg.

4. A pipe supporting device for supporting pipes traveling between support members, said device being removably mountable to and extending between a pair of support members, said device comprising:

an elongate rod having a first end and a second end, said rod being generally planar and having substantially flat top and bottom surfaces, said rod having a first side edge and a second side edge;

a plurality of ridges, each of said ridges being elongate, each of said ridges being integrally coupled to said top surface of said rod, each of said ridges extending between said first and second ends of said rod, a first of said ridges being positioned generally between said first and second side edges, a second ridge being generally adjacent to said first side edge, a third ridge being generally adjacent to said second side edge;

a pair of mounting means for removably mounting said rod to the support members, each of said mounting means being integrally coupled to an end of said rod;

a plurality of coupling members for coupling the pipes to said rod, each of said coupling members comprising:

a first bracket adapted for removably coupling to said rod and engaging at least two of said ridges; and a second bracket adapted for removably coupling the pipe to said first bracket, said second bracket being attached to said first bracket.

5. The pipe supporting device as in claim 4, wherein said rod comprises a first portion and a second portion, said first portion being extendably insertable in said second portion such chat said rod comprises a telescoping rod.

6. The pipe supporting device as in claim 4, wherein each of said mounting means comprises a plate extending downwardly away from said top surface, each of said plates being orientated generally perpendicular to said rod, each of said plates having at least on hole therein for receiving a fastening means for fastening said plates to the support members.

* * * * *